(12) United States Patent
Shepperd et al.

(10) Patent No.: US 8,841,469 B2
(45) Date of Patent: Sep. 23, 2014

(54) CHEMICAL ADDITIVES AND USE THEREOF IN STILLAGE PROCESSING OPERATIONS

(75) Inventors: Paul W. Shepperd, Newark, DE (US); McCord Pankonen, Marshall, MN (US); Jeffrey T. Gross, Lacenter, WA (US)

(73) Assignee: Solenis Technologies, L.P., Wilmington, DE (US)

( * ) Notice: Subject to any disclaimer, the term of this patent is extended or adjusted under 35 U.S.C. 154(b) by 337 days.

(21) Appl. No.: 13/370,456

(22) Filed: Feb. 10, 2012
(Under 37 CFR 1.47)

(65) Prior Publication Data
US 2012/0245370 A1 Sep. 27, 2012

Related U.S. Application Data

(60) Provisional application No. 61/454,634, filed on Mar. 21, 2011.

(51) Int. Cl.
*C11B 13/00* (2006.01)
*C11B 1/10* (2006.01)

(52) U.S. Cl.
CPC . *C11B 1/10* (2013.01); *C11B 13/00* (2013.01); *Y02E 50/17* (2013.01)
USPC ............ 554/12; 554/8; 554/9; 554/204

(58) Field of Classification Search
None
See application file for complete search history.

(56) References Cited

U.S. PATENT DOCUMENTS

| | | | |
|---|---|---|---|
| 7,497,955 B2 * | 3/2009 | Scheimann et al. | .......... 210/709 |
| 7,602,858 B2 | 10/2009 | Dally | |
| 2006/0006116 A1 | 1/2006 | Scheimann et al. | |
| 2007/0210007 A1 | 9/2007 | Scheimann et al. | |
| 2008/0176298 A1 | 7/2008 | Randhava et al. | |
| 2010/0331580 A1 | 12/2010 | Ridgley | |

OTHER PUBLICATIONS

Kelly S. Davis, "Corn Milling, Processing and Generation of Co-Products", Minnesota Nutrition Conference, Technical Symposium, 11, Sep. 2001, 7 pages.
Taherzadeh, M.J., and Karimi, K., "Enzyme-based hydrolysis process for ethanol from lignocellulosic materials: a review", BioResources, vol. 2, No. 4, 2007, pp. 707-738.
International Search Report , Form PCT/USA/210, dated Apr. 13, 2012, pp. 2.
Klinkesorn, Utai et al., "Stability and rheology of corn oil-in-water emulsions containing maltodextrin", Food Research International, vol. 37 (2004) pp. 851-859.
Wang, Hui et al., "Effect of Low-Shear Extrusion on Corn Fermentation and Oil Partition", J. Agricultural and Food Chemistry, vol. 57 (2009) pp. 2302-2307.
Kadioglu, Sezin Islamoglu et al., "Surfactant-Based Oil Extraction of Corn Germ", J Am Oil Chm Soc (2011) vol. 88 pp. 863-869.

* cited by examiner

*Primary Examiner* — Yate K Cutliff
(74) *Attorney, Agent, or Firm* — Joanne Rossi; Michael Herman

(57) ABSTRACT

A method is provided for the use of a chemical additive to improve the separation of oil from the process stream (whole stillage, thin stillage or syrup) generated as a byproduct in corn to ethanol production.

20 Claims, 1 Drawing Sheet

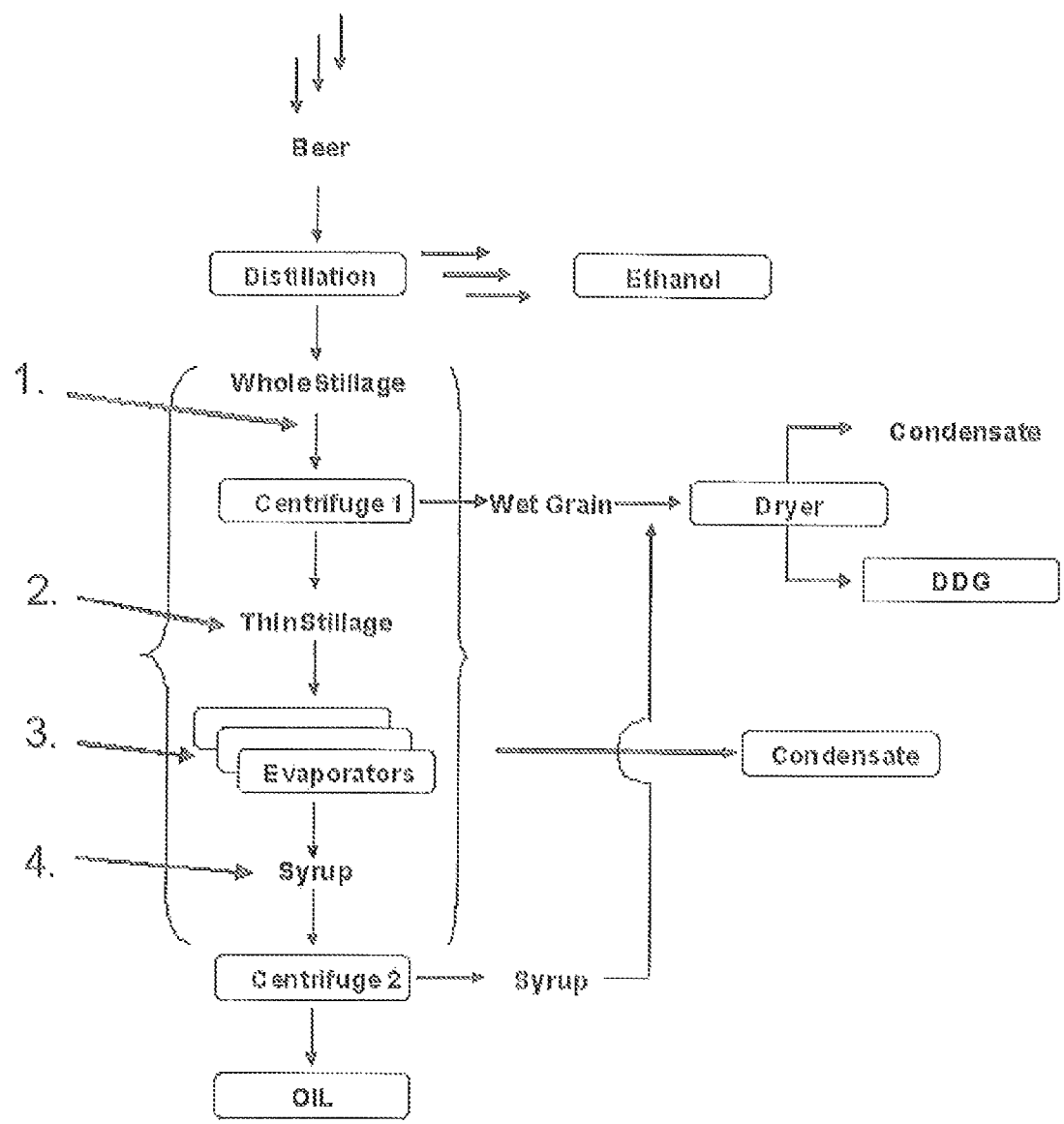

CHEMICAL ADDITIVES AND USE THEREOF IN STILLAGE PROCESSING OPERATIONS

This application claims the benefit of provisional application number U.S. 61/454,634, filed Mar. 21, 2011, the entire contents of which are hereby incorporated by reference.

FIELD OF THE INVENTION

This invention pertains to recovering oil in corn to ethanol production.

BACKGROUND OF THE INVENTION

There are two types of corn to ethanol processing, wet milling and dry milling. The central difference between the two processes is how they initially treat the grain. In wet milling, the corn grain is steeped in water, and then separated for processing in the first step. Dry milling, which is more common, requires a different process.

The corn dry-milling process utilized in the production of ethanol is well known. For example see Kelly S. Davis, "Corn Milling, Processing and Generation of Co-Products", Minnesota Nutrition Conference, Technical Symposium, 11 Sep. 2001. Ethanol plants typically treat whole stillage from the beer column via centrifugation to produce wet cake and thin stillage then further treat the thin stillage stream by subjecting it to multiple effect evaporation to produce increase the solids and recover the distillate for return use in the process (FIG. 1). As solids increase the thin stillage is typically referred to as syrup (see FIG. 1). The syrup is typically combined with wet cake or distillers dry grains and sold as animal feed. These processes are well know in the industry and are generally employed in plant design in the industry.

In an effort to take advantage of co-product streams, many plants have added oil removal processes in which the thin stillage (syrup) is subjected to processes, such as centrifugation or extraction, to remove corn oil from the syrup. For example, the application of centrifuges to the separation of corn oil from syrup is in wide use in the fuel ethanol industry. While the theoretical yield of oil per bushel of processed corn is 1.6 pound per bushel, many of the commercial installations fall far short of this. Thus there remains a need to improve the process to maximize the oil yield of the process.

Recently there has been effort directed at increasing the value model of the corn to ethanol production process by extracting the oil from the thin stillage byproduct. Cantrell at al. in U.S. Pat. No. 7,602,858 B2 describes a mechanical method of separating the oil from concentrated thin stillage, referred to as the "syrup", using a disk stack centrifuge. Randhava et al. in U.S. Pat. Appl. No. 2008/0176298 A1 teaches the use of an alkyl acetate solvent for extraction of corn oil in an ethanol production process.

Although the prior art references are effective, there is still opportunity to improve the oil extraction process to further maximize the commercial value of the process. Of particular interest are technologies which do not require the adoption of capital expenditures to implement a new mechanical solution and/or significant process change such as the use of an extraction solvent that requires recycling.

SUMMARY OF THE INVENTION

The present invention discloses a method comprising the step of adding a chemical additive to improve the separation of oil from the process streams (whole stillage and/or, thin stillage and/or syrup) generated as a byproduct in corn to ethanol production. The method can be used in either a wet milling process or a dry milling process. Preferably the method is employed in a dry-milling process. The method involves treating any of the process streams down stream of the distillation operation in corn to ethanol production with a chemical additive which enhances the mechanical separation of oil from said streams.

One aspect of the invention is the application of a chemical additive to the thin stillage or syrup, prior to the oil separation centrifuge, to increase the yield of oil. This could comprise one, or a combination of, addition points in the thin stillage unit operation such as: 1) at the inlet to the pre-mix or retention heat tanks, 2) the inlets and/or outlets of one or more of the evaporators, and/or 3) just prior to the inlet of the centrifuge.

Another aspect of the invention is the application of the chemical additive to the whole stillage stream prior to separation of the wet cake from the thin stillage. A point of good mixing such as the inlet to a pump is preferred.

Preferably the chemical additive is a material that is recognized as safe such that it does not comprise the potential end use of the resulting dry distiller grain (DDG) as a feedstock.

Some embodiments of the invention provide a benefit of producing a cleaner oil (high quality) by minimizing the suspended solids and/or water content of the resultant oil.

Some embodiments of the invention provide a benefit to the maintenance of the centrifuge in the manner of reduced deposited materials thereby lessening the need for outages and cleanings as well as permitting extension of time between backflush purges leading to increased production and less down time. This additionally provides the value of simpler and easier cleaning of the centrifuge at outages.

Some embodiments of the invention provide a benefit to the maintenance of the evaporators in the manner of reduced deposited materials decreasing the frequency and complexity of cleanings, decreasing down time, thereby reducing costs.

BRIEF DESCRIPTION OF THE FIGURES

FIG. 1: Partial generic overview representative of corn to ethanol production indicating preferred addition points for the chemical additive: to the whole stillage prior to separation into wet cake and thin stillage, at or near the inlet to centrifuge 1, point 1; at or near the inlet of the evaporator, point 2; directly into the evaporator(s), point 3; to a point prior to or at the inlet of the oil centrifuge, centrifuge 2, point 4

DETAILED DESCRIPTION OF THE INVENTION

The present invention relates to a method which can be applied to the whole stillage, the thin stillage or the syrup processing operation in corn to ethanol production, preferably employing a dry-milling process, to provide for an increase in oil yield.

The present invention describes a method for recovering oil from corn to ethanol production, the method comprises the step of adding at least one chemical additive to a process stream where the. at least one chemical additive comprises a functionalized polyol derived from a sorbitol, a sorbitan, or isosorbide.

One aspect of the method comprises application of a chemical additive to the thin stillage process stream and/or syrup concentrate prior to the oil separation step. Preferably the oil separation from the concentrated syrup is achieved by a mechanical operation such as a membrane or centrifuge. Most preferably the separation is achieved by a centrifuge such as a disk stack or horizontal tricanter centrifuge. Other mechanical separators can also be used in the present invention including, but not limited to, reverse centrifugal cleaners.

A second aspect of the method comprises application of a chemical additive to the whole stillage prior to separation into thin stillage and wet cake.

The chemical additive may be added at different points in the separation system. Addition points for the chemical additive include, but are not limited to, to the whole stillage prior to separation into wet cake and thin stillage, a point after the oil-centrifuge feed pump but prior to the intake of the centrifuge, a point after the evaporators and prior to the pump that feeds the centrifuge, and a point after the syrup feed tank and before the centrifuge. Generally the syrup feed tank is located after the evaporators and before the centrifuge FIG. 1 is a partial generic overview representative of corn to ethanol production. In general in the corn to ethanol process, after a number of different mashing and fermentation steps the corn is converted to material referred to as "beer". The beer is then processed through a distillation process to separate the crude ethanol from the thick (whole) stillage byproduct. The thick stillage is subjected to a solid separation centrifugation process to yield distillers wet grain and thin stillage. The thin stillage is then typically processed through a number of evaporator units to yield the concentrated syrup. This syrup may then be further processed, for example by oil separation centrifugation, to separate the oil from the syrup. The remaining syrup is then typically combined with the distillers wet grain, then dried, to yield dry distillers grain (DDG). The chemical additive of the present invention is typically added to the process stream at different points in the separation process. Some preferred addition points are shown in FIG. 1. Addition points include the whole stillage process stream prior to separation into wet cake and thin stillage, the process stream at or near the inlet to the centrifuge or after the solid separation centrifuge. The chemical additive can be added, prior to or at the inlet and/or outlet of one or more of the thin stillage evaporators, in the evaporators, to the syrup just prior to the oil separation centrifuge and/or at the inlet of the premix or retention heat tanks. The areas in the process where the chemical additive is typically charged are designated by the bracketed ("{ . . . }") area in the diagram.

Chemical additives useful in the present invention are those which provide an increase in oil production if added to the processing of the whole stillage, prior to separation of the wet cake or to the thin stillage prior to the oil separation operation. The application of the chemical additives could comprise of one or more addition points within the thin stillage processing unit operation. Preferably the chemical additives are applied to the syrup resulting from concentration of the thin stillage in an evaporator.

One class of chemical additives useful in the present invention are functionalized polyols derived from sorbitol, isosorbide or a sorbitan, including 1,4-sorbitan.. Preferred chemical additives are functionalized polyols comprising alkoxylated sorbitan monoalkylates, alkoxylated sorbitan dialkylates, alkyoxylated sorbitan trialkylates and mixtures thereof. Preferably the alkoxylated alkylates of sorbitan have an alkyl chain length of from about 6 to about 24 carbons, preferably from about 8 to about 18 carbons, preferable the alkoxylated sorbitan alkylates are alkoxylated esters of sorbitan. The alkoxylated alkyate of sorbitan is preferably alkoxylated with from about 5 to about 100 moles of alkyl oxide, preferably from 5 to 60 moles, preferably from 10 to 30 moles, most preferred from 12 to 30, the alkoxylated sorbitan alkylates are alkoxylated esters of sorbitan. The preferred alkyl oxides are ethylene oxide and propylene oxide or a combination thereof.

Preferred alkoxylated alkylate of sorbitan are sorbitan monolaurate, sorbitan monooleate, sorbitan monopalmitate or sorbitan monostearate that have been alkoxylated with less than 50 moles of ethylene oxide or propylene oxide or a combination thereof. More preferred alkoxylated alkylates of sorbitan are sorbitan monolaurate, sorbitan monooleate, sorbitan monopalmitate or sorbitan monostearate that have been ethoxylated with from about 10 moles to about 30 moles of ethylene oxide or propylene oxide or a combination thereof, preferably the alkoxylated sorbitan alkylates are alkoxylated esters of sorbitan. More preferred alkoxylated alkylates of sorbitan are sorbitan monolaurate, sorbitan monooleate, sorbitan monopalmitate or sorbitan monostearate that have been alkoxylated with from about 12 moles to about 25 moles of ethylene oxide or propylene oxide or a combination thereof, preferably the alkoxylated sorbitan alkylates are alkoxylated esters of sorbitan. Particularly preferred are sorbitan monolaurate, sorbitan monooleate, sorbitan monopalmitate or sorbitan monostearate that have been alkoxylated with approximately 20 moles of ethylene oxide or propylene oxide or a combination thereof. A further preference is for compositions/grades of this class of materials that are, or could be, classified as recognized as safe such that they do not comprise the potential end use of the resulting dry distiller grain as a feedstock.

Classes of chemical additives that may be useful in the present application are alkoxylated esters of sorbitan, alkoxylated fatty alcohols, alkoxylated fatty acids, sulfonated alkoxylates, alkyl quaternary ammonium compounds, alkyl amine compounds, alkyl phenol ethoxylates and mixtures thereof. Additional classes of chemical additive that may be useful for the invention include, fatty acid salts (sodium, ammonium or potassium) and low molecular weight silicone surfactants. The alkoxylate portion of the forgoing classes of chemicals may be any mixture of ethylene oxide and propylene oxide added in block or random fashion to the base molecule. The most preferred are the alkoxylated esters of sorbitan.

The chemical additive can be a blend of materials as described above. Multiple functionalized polyols derived from a sorbitol, isosorbide, and/or sorbitan, including, 1,4-sorbitan, and can be mixed together and used as the chemical additive for the present invention. Other additives that may be useful in conjunction with the functionalized polyols include triglycerides, such as vegetable oil; liquid mixtures containing up to 5% by weight hydrophobic silica; and high melting point (greater than 60° C.) waxes. These additives are well known in the defoamer industry. Vegetable oils include but are not limited to soybean oil, canola and corn oil. The triglyceride or the liquid mixtures containing up to 5% by weight hydrophobic silica or the high melting point wax can be added in an amount of from 1 to 100% by weight based on the weight of the chemical additive.

The chemical additive can be added to the process stream (whole stillage, thin stillage or syrup) in an amount of from 50 to 5000 ppm based on the weight of the process stream), or from 100 to 5000 ppm or from 200 to 2500 ppm, preferably from 300 to 1300 ppm, from 500 to 1100 ppm, from 500 to 800 ppm. The chemical additive is added to the process stream (whole stillage, thin stillage or syrup) in an amount of at least 50 ppm, preferable at least 100 ppm, more preferably at least 200 ppm, more preferably at least 300. Preferable the amount of chemical additive is less than 10,000 ppm, less than 5000 ppm, less than 2500 ppm, less than 1500 ppm, or less than 1000 ppm.

These chemistries may be applied under the normal ranges of temperatures and pHs found in a variety of the process stream typical of commercial operations. For example, according to but not limited by the teachings of Cantrell at al. in U.S. Pat. No. 7,602,858 B2 a preferred composition of the syrup, resulting from concentration of thin stillage, for centrifugal separation of the oil is a temperature between 150-212° F., pH between 3-6, and a moisture content greater than 15% and less than 90% by weight.

The chemical additive can be heated and applied to the process stream (whole stillage, thin stillage or syrup) in a temperature range of from 18° C. to 100° C., preferably from 25° C. to 85° C., more preferably from 30° C. to 80° C. In some embodiments when the heated additive is added to the process stream improved separation of the oil is observed as compared to using 65° F. (18.3° C.) chemical additive.

A negative impact of processing the syrup at higher temperatures to improve the yield of oil, for example temperatures greater than 195° F. or 205° F. depending on the process, is that discoloration of the syrup results which imparts a negative appearance to the dry distillers grain (DDG) and lessens that value of this material. The higher processing temperatures can cause higher color of the oil itself. As such, an added benefit of the invention is the ability to increase the oil yield at lower processing temperatures and mitigate the potential of the processed syrup to negatively impact the appearance and value of the DDG and the oil. Reducing processing temperatures also leads to overall energy savings.

EXAMPLES

Example 1

Ashland PTV M-5309, an monolaurate ester of ethoxylated (20 moles) sorbitan was added at dosage of 611 ppm into the syrup feed line on the inlet side of the pump feeding a disk stack centrifuge at a mid-West corn to ethanol producer to yield an approximately 29% increase in corn oil output (from approximately 1.7 gpm before treatment to approximately 2.2 gpm after treatment). In addition, the suspended solids content of a 50 ml aliquot of the isolated oil after centrifugation in the laboratory was observed to drop from ~4 ml to ~1 ml after treatment.

Table 1 summarizes a dose response for two 4-hour trials, and a result of a 5-day trial, conducted at different time frames at this site. The noted amount of Ashland PTV M-5309 is on a product basis relative to the syrup feed. For the 4-hour trials the data reported is the oil production rate after the system had equilibrated relative to the untreated production rate (0 ppm) at the initiation of the trial. For the 5-day trial the result is the average production rate over that time period relative to the untreated production rate (0 ppm) at the initiation of the trial.

TABLE 1

| Test Duration | PTV M-5309 ppm | Oil Production (gal/min) | Oil Production Increase % |
|---|---|---|---|
| 4-Hours | 0 | 1.22 | — |
|  | 467 | 1.43 | 17% |
|  | 861 | 1.62 | 33% |
|  | 1242 | 1.64 | 34% |
| 4-Hours | 0 | 1.7 | — |
|  | 375 | 2.0 | 18% |
|  | 611 | 2.2 | 29% |
|  | 847 | 2.2 | 29% |
|  | 1242 | 2.2 | 29% |
| 5-Days | 0 | 0.5 | — |
|  | 680 | 1.5 | 200% |

Example 2

This field trial examined the difference between adding 680 ppm of Ashland PTV M-5309, an alkoxylated sorbitan ester, to the syrup stream at a mid-West corn to ethanol producer at different addition points. One of the addition points was the inlet side of the pump feeding a disk stack centrifuge as in Example 1. The other addition point examined was after the pump and directly into the inlet of the disk stack centrifuge. Relative to the untreated daily oil production rate just prior to the trial an increase in daily oil production of approximately 15% and 17% was measured after treatment, respectively.

Example 3

This field trial was similar to Example 1 except 690 ppm of Ashland PTV M-5309 was added to the syrup stream at a mid-West corn to ethanol producer at the inlet side of the pump feeding a horizontal tricanter centrifuge. Upon treatment the oil production rate was observed to increase by approximately 45% relative to the untreated production rate at the initiation of the trial.

Example 4

This field trial examined the effect of temperature on the performance of the chemical additive. Ashland PTV M-5309, at a temperature of 65° F. (18.3° C.), was added just prior to an oil extraction centrifuge to produce oil at a rate of 2.3 gallons per a minute. Ashland PTV M-5309 was then heated to a temperature of 120° F. (48.9° C.) and was added just prior to an oil extraction centrifuge to produce oil at a rate of 2.7 gallons per a minute. The higher temperature chemical additive increased the oil recovery by 17%.

Example 5

Ashland PTV M-5309 was added at dosage of 980 ppm into the syrup feed line on the inlet side of the pump feeding a disk stack centrifuge at a mid-West corn to ethanol producer to yield a corn oil output of approximately 5.47 gpm. In a second trial phase Ashland PTV M-5309 was added at dosage of 490 ppm into the syrup feed in conjunction with 490 ppm of Nofoam 7077 (SSC industries, East Point, Ga.) to provide a corn oil production of 5.76 gpm. This corresponded to a 5% increase of oil production.

Example 6

This laboratory experiment examined the effect of alkyl chain length on product effectiveness. Various alkoxylated esters of sorbitan were tested. The ethoxylated portion of the product was maintained at 20 moles. Products with varying alkyl chains, lauric, palmitic, stearic and oleic were tested by addition of 0.03 gram of additive to 100 ml of corn syrup at 185° F. followed by 0.5 minutes of intense mixing. 10 ml of each sample was transferred to a centrifuge tube and was then centrifuging for 10 minutes at 3000 rpm. The amount of oil was determined by measuring the height of the oil layer in the centrifuge tube.

TABLE 2

| Fatty Acid Chain Length | Oil (mm) |
| --- | --- |
| Lauric C12 | 5 |
| Palmitic C16 | 6 |
| Stearic C18 | 5 |
| Oleic C18:1 | 5 |

As can be seen in Table 2 comparable performance was observed for the various chain lengths tested.

Example 7

This laboratory experiment examined the effect of unsaturation in the alkyl chain on product effectiveness. Various alkoxylated esters of sorbitan were tested. The ethoxylated portion of the product was maintained at 20 moles. Products tested were prepared from stearic and oleic acids. Tests were run at 0.12 gm, 0.15 gm and 0.18 gm of additive to 100 ml of corn syrup at 185° F. followed by 0.5 minutes of intense mixing. 10 ml of each sample was transferred to a centrifuge tube and was then centrifuged for 10 minutes at 3000 rpm. The amount of oil was determined by measuring the height of the oil layer on the top of the centrifuge tube.

TABLE 3

| Fatty Acid Chain Length | Dosage 0.12 gm Oil Recovered (mm) | Dosage 0.15 gm Oil Recovered (mm) | Dosage 0.18 gm Oil Recovered (mm) |
| --- | --- | --- | --- |
| Stearic C18 | 4 | 5 | 6 |
| Oleic C18:1 | 3 | 4 | 4 |

As can be seen in Table 3 improved performance for the saturated chain product.

Example 8

This study examined the affectiveness of the chemistry on whole stillage using the method of Example 5. PTV M-5309 was added to the whole stillage prior to the wet cake centrifuge at a commercial corn to ethanol plant. Samples of the thin stillage coming out from the centrifuge were collected. The thin stillage samples were subjected to laboratory centrifugation. The results below show that addition of the product to the whole stillage does enhance oil separation.

TABLE 4

| Sample number | ppm of product added | description oil in centrifuge tube |
| --- | --- | --- |
| Baseline | 0 | No visible oil |
| 1 | 340 | A few drops of oil - no distinct layer |
| 2 | 630 | A distinct layer of oil present |
| 3 | 883 | Oil layer present |

Example 9

This laboratory experiment examined the effect of blending various polysorbatans on oil separation. Various alkoxylated esters of sorbitan were tested. The table below shows the various blends of alkoxylated esters of sorbitan. In each example, 0.18 grams of blended material was added to 0.100 ml of corn syrup at 185° F. followed by 0.5 minutes of intense mixing. 10 ml of each sample was transferred to a centrifuge tube and was then centrifuged for 10 minutes at 3000 rpm. The amount of oil was determined by measuring the height of the oil layer on the top of the centrifuge tube.

Polysorbitan monooleate (5 moles ethylene oxide): psmo5
Polysorbitan monooleate (20 moles ethylene oxide): psmo20
Polysorbitan monolaurate (20 moles ethylene oxide): psml20
Polysorbitan monostearate (20 moles ethylene oxide): psms20

TABLE 5

| Sample | Blend | Oil release (mm) |
| --- | --- | --- |
| 1 | 100% psmo5 | 0 |
| 2 | 45/55 psml20/psmo5 | 2 |
| 3 | 80/20 psmo20/psmo5 | 3 |
| 4 | 75/25 psml20/psmo5 | 3.5 |
| 5 | 89/11 psml20/psmo5 | 4 |

While the present invention has been described with respect to particular embodiments thereof, it is apparent that numerous other forms and modifications will be obvious to those skilled in the art. The appended claims and this invention generally should be construed to cover all such obvious forms and modifications, which are within the true scope of the present invention.

The invention claimed is:

1. A method for recovering oil from corn to ethanol production, the method comprising the step of adding at least one chemical additive to a process stream wherein the at least one chemical additive comprises a functionalized polyol derived from a sorbitol, a sorbitan, or isosorbide.

2. The method of claim 1 wherein the functionalized polyol is derived from 1, 4 sorbitan or isosorbide.

3. The method of claim 1 wherein the functionalized polyol comprises an alkoxylated sorbitan alkylate.

4. The method of claim 3 wherein the chain length of the alkylate is from 6 to 24 carbons.

5. The method of claim 4 wherein the chain length of the alkylate is from 8 to 18 carbons.

6. The method of claim 3 wherein the alkoxylated sorbitan alkylate has been alkoxylated with from 5 to 60 moles of alkyl oxide.

7. The method of claim 6 wherein the alkoxylated sorbitan alkylate has been alkoxylated with 10 to 30 moles of alkyl oxide.

8. The method of claim 7 wherein the alkyl oxide is selected from ethylene oxide, propylene oxide and mixtures thereof.

9. The method of claim 3 wherein the alkoxylated sorbitan alkylate comprises a sorbitan monolaurate that has been alkoxylated with from about 10 to about 30 moles of an alkoxylate wherein the alkoxyate is selected from ethylene oxide, propylene oxide or mixtures thereof.

10. The method of claim 3 wherein the alkoxylated sorbitan alkylate comprises a sorbitan monooleate that has been alkoxylated with from about 10 to about 30 moles of an alkoxylate wherein the alkoxyate is selected from ethylene oxide, propylene oxide or mixtures thereof.

11. The method of claim 3 wherein the alkoxylated sorbitan alkylate comprises a sorbitan monolaurate, sorbitan monooleate, sorbitan monopalmitate or sorbitan monostearate that has been ethoxylated with from about 12 to about 25 moles of an alkoxylate wherein the alkoxyate is selected from ethylene oxide, propylene oxide or mixtures thereof.

12. The method of claim 1 wherein the amount of chemical additive added is from 300 to 1300 ppm based on weight of the process stream.

13. The method of claim 12 wherein the amount of chemical additive added is from 500 to 1100 ppm based on weight of the process stream.

14. The method of claim 1 wherein the chemical additive added is heated to at least 30° C. prior to the addition to the process stream.

15. The method of claim 1 further comprising the step of adding a triglyceride to the process stream.

16. The method of claim 15 wherein the amount of triglyceride is from 1 to 100% by weight based on the weight of the chemical additive.

17. The method of claim 2 wherein the chemical additive is heated prior to the addition to the process stream.

18. The method of claim 17 wherein the chemical additive is heated between 25° C. to 85° C.

19. The method of claim 1 wherein the addition point in the process stream is selected from the whole stillage process stream prior to removal of the wet cake, the thin stillage process stream at the inlet and/or outlets of one or more of the evaporators, in the evaporator, at the inlet to the pre-mix or retention heat tanks, to the syrup just prior to the oil separation centrifuge or any combination thereof.

20. A method of claim 1 further comprising the step of adding an additional process additive wherein the additional process additive is selected from the group consisting of liquid mixtures containing up to 5% by weight hydrophobic silica; and high melting point (greater than 60° C.) waxes.

* * * * *

UNITED STATES PATENT AND TRADEMARK OFFICE
CERTIFICATE OF CORRECTION

| | | |
|---|---|---|
| PATENT NO. | : 8,841,469 B2 | Page 1 of 1 |
| APPLICATION NO. | : 13/370456 | |
| DATED | : September 23, 2014 | |
| INVENTOR(S) | : Shepperd et al. | |

It is certified that error appears in the above-identified patent and that said Letters Patent is hereby corrected as shown below:

In the claims

COL. 8, claim 1, line 30, delete "to" and substitute therefor --in--; line 30, before "process" insert --corn to ethanol-- so that the claim reads:

A method for recovering oil from corn in ethanol production, the method comprising the step of adding at least one chemical additive to a corn to ethanol process stream wherein the at least one chemical additive comprises a functionalized polyol derived from a sorbitol, a sorbitan, or isosorbide.

Signed and Sealed this
Twenty-second Day of March, 2016

Michelle K. Lee
*Director of the United States Patent and Trademark Office*